UNITED STATES PATENT OFFICE.

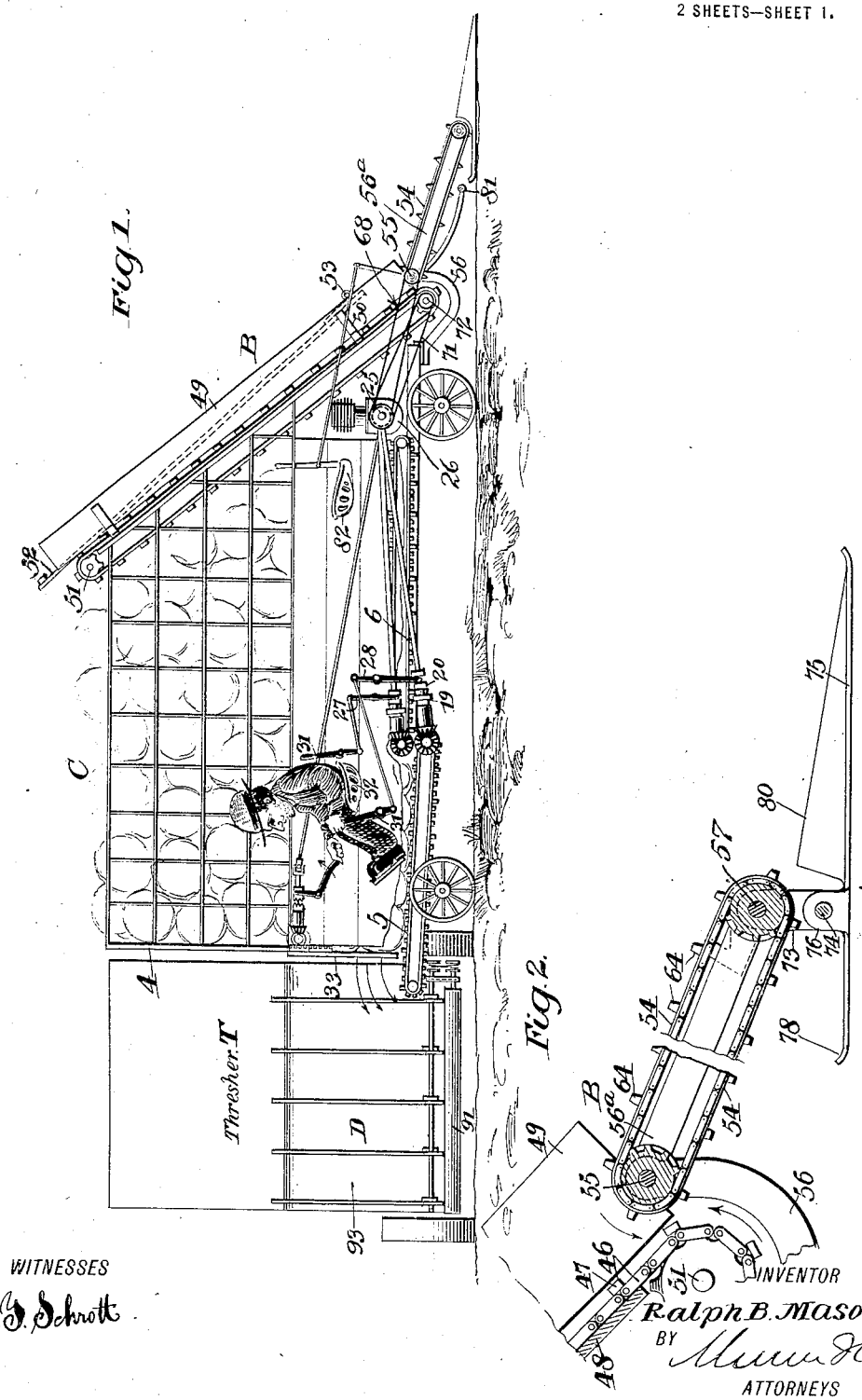

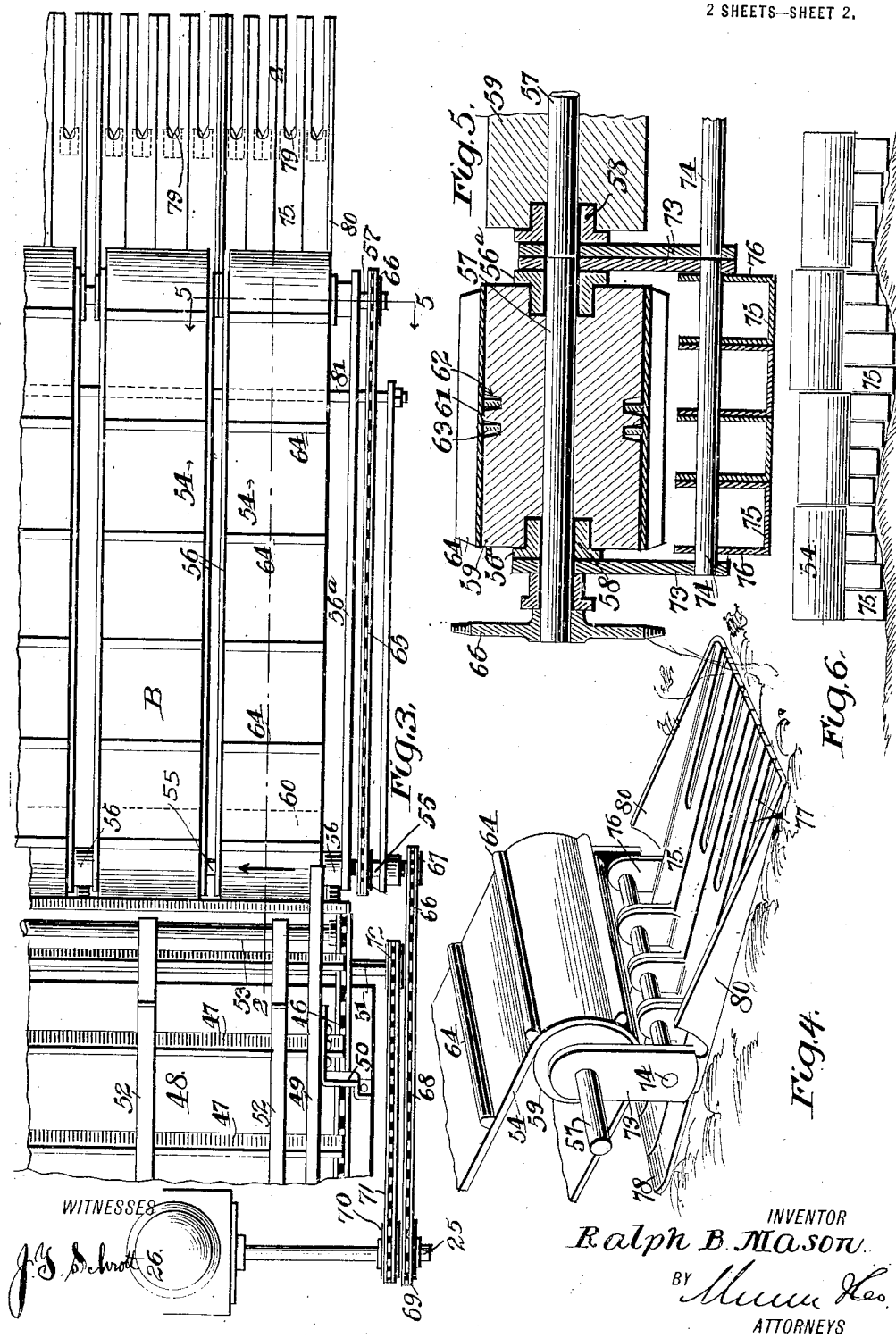

RALPH BARCLAY MASON, OF SOMERSET, PENNSYLVANIA.

AGRICULTURAL IMPLEMENT.

1,344,552. Specification of Letters Patent. Patented June 22, 1920.

Application filed March 2, 1918. Serial No. 219,990.

*To all whom it may concern:*

Be it known that I, RALPH B. MASON, a citizen of the United States, residing at Somerset, in the county of Somerset and State of Pennsylvania, have invented certain new and useful Improvements in Agricultural Implements, of which the following is a specification.

My invention relates to improvements in agricultural implements; it being more particularly an improvement in loading conveyers for sheaf loaders, and it consists in the constructions, combinations and arrangements herein described and claimed.

An object of my invention is to provide a device as described, adapted more particularly for use in connection with a threshing machine, which consists of a sheaf loader adapted to travel over the ground and gather the sheaves into a container, the principal part of the invention in this application residing in the container loading conveyer as before stated; a sheaf distributer attached to the thresher being adapted to receive the sheaves from the loader when the latter is backed up to the distributer and the sheaf discharge gate is opened.

Another object of the invention is to provide an oscillating elevator forming a part of the loading conveyer which is so arranged that it may conform to uneven ground and thus insure the gathering of all of the sheaves, even those that may have fallen into depressions in the ground.

Another object of the invention is to provide movable gathering shoes on the front of the oscillating elevator, these shoes including removable knives for cutting vines and brush in the way of the loader.

Another object of the invention is to provide a presser frame on the relatively stationary elevator of the conveyer.

Other objects and advantages will appear in the following specification, reference being had to the accompanying drawings, in which:

Figure 1 is a side elevation of a sheaf loader showing the application of the improved conveyer and showing it backed into position beside a distributer which coöperates both with the thresher and the sheaf loader.

Fig. 2 is a detail section taken substantially on the line 2—2 of Fig. 3.

Fig. 3 is a plan view of a portion of the front end of the loader.

Fig. 4 is a fragmentary detail perspective view of one of the oscillating elevator units.

Fig. 5 is a cross section on the line 5—5 of Fig. 3, and

Fig. 6 is a diagrammatic view illustrating the adaptability of the oscillating elevator units to uneven ground.

In order that a general idea may be gained of the agricultural implement, of which the conveyer that forms the subject matter of this application is a part, attention is directed to Fig. 1 wherein it is shown that the sheaf loader consists of a sheaf conveyer B and the sheaf container C. A distributer D coöperates with the sheaf loader by alining the sheaves as they are discharged from the container. The sheaves are alined so that they are fed to the thresher T in a uniform and orderly manner.

The container C and distributer D both form the subject matters of divisional applications to which reference may be had for a complete description of these mechanisms. A general description of these mechanisms is however considered to be an aid in the understanding of the present invention.

The sheaf loader is arranged to be moved over the ground. As this is done, the sheaves are gathered by the oscillating portion of the conveyer B at the front. The fixed elevator of the conveyer then carries the sheaves into the container C. The container has a bottom made up of a plurality of independently movable conveyers or endless aprons and a mechanically operated gate 33 at the rear.

The bottom conveyers 5 and 6 are set in motion by the operator who sits in the seat 32 and actuates the handles 31. These are joined to levers 27 and 28 which is turn shift the movable clutch members 20 toward and away from the fixed members 19. Power is gotten from an engine 26. In order that the distributer D may operate properly to turn the sheaves in line for the thresher, it has a broad bottom belt 91 that runs toward the thresher. Alternately oppositely movable carrier chains perform the sheaf-turning function before the sheaves reach the short elevator 93 that carries the sheaves to the thresher.

Having thus described the correlated parts in a general way, attention is directed more particularly to the conveyer B.

A so-called relatively fixed elevator is disposed at an inclination to the rear, at the front of the loader. The elevator comprises a pair of endless chains 46 connected by cleats or slats 47. The chains 46 run over a platform 48, near the lateral extremities of the platform. The elevator is as wide as is the container C. Sideboards 49 supported on brackets 50, are spaced a short distance from the chains 46 toward the center of the elevator, to prevent the straw in the sheaves from entangling with the chains. The chains 46 run over sprockets on shafts 51 at the top and bottom of the elevator.

A presser consisting of a plurality of slats 52 disposed longitudinally with respect to the elevator, is pivoted on a rod 53. The rod may be mounted at its ends either in the sideboards 49, or some other suitable support especially provided for the purpose. The presser is loose or perfectly free at the top, and normally rests on the elevator substantially as shown in Fig. 1. The lower end of the presser is spaced from the elevator as will readily be seen, thus forming a mouth as it were, into which the sheaves are crowded as will presently more fully appear. The function of the presser is, to keep the sheaves in contact with the cross slats 47 of the elevator, and thus insure the elevation of the sheaves to the point of discharge from whence they fall into the container C.

The oscillating elevator consists of a plurality of elevator units 54. A common shaft 55 is mounted in bearings 56 at the front of the loader. The bearings 56 include brackets so shaped as to partly embrace the lower end of the relatively stationary elevator, and find its mounting on an adjacent portion of the frame of the loader. There are a plurality of the bearings 56 for the purpose of supporting the common shaft 55 at a plurality of places. There may be a bearing between each of the elevator units, but to place one of the bearings between every pair of the units as indicated in Fig. 3, will probably be sufficient.

Side frames 56ª extend from the common shaft 55, at the sides of each of the belts 54 of the elevator units. The lower ends of each pair of the side frames provide mountings for individual shafts 57. There is one of the shafts 57 for each of the elevator units. The side frames 56ª have hubs 58 as shown in Fig. 5 in which the shafts 57 are journaled. The end of the shafts 57 project slightly beyond the side frame as clearly indicated in Fig. 5.

Pulleys 59 are fixed on the shafts 57, and a companion pulley 60 is mounted in alinement with each of the pulleys 59, on the common shaft 55. The belts 54 run over the alining pulleys. The pulleys have sprocket teeth in the middle, but the teeth lie flush with the peripheries of the pulleys. Attention is directed to Fig. 5. Here it will be seen that the sprocket teeth 61 of the pulley 59, are formed in an annular groove 62, which also accommodates the chain 63 upon which the belt 54 may or may not be secured. It will be observed that the groove 62 also forms a housing for the bight of the chain which by this arrangement, also lies within the periphery of the pulley 59.

Cleats or slats 64 are secured transversely of the belts 54. The pulleys 59 as well as the pulleys 60, are recessed on the ends to receive the hubs 58 of the side frames. It may be desirable to positively drive one or more of the individual shafts 57 from the common shaft 55. Such an arrangement is indicated in a single instance in Fig. 3. A chain 65 is applied to sprockets 66 on the shafts 55 and 57, the shaft 57 being made slightly longer at one side for the purpose of receiving the sprockets 66.

In this connection it will be observed that the shaft 55 has a sprocket 67 on the end, around which a chain 68 passes. The chain is driven by a sprocket 69 on the engine shaft 25. A second sprocket 70 on the engine shaft has a chain 71 which passes around a sprocket 72 on the end of the lower elevator shaft 51. Both elevators are thus independently driven, and it would be a matter of common practice to provide suitable shifting clutches so that the operation of the respective elevators may be governed as desired.

The projecting ends of the shafts 57 previously mentioned, provide supports for hangers 73 in the lower ends of which, shoe shafts 74 are mounted. There is a shoe shaft for each elevator unit, and the ends of each shaft are secured in the hangers 73 as plainly shown in Fig. 5.

A plurality of shoes 75 are hung upon each shaft 74, ears 76 being formed on each shoe for the purpose. The front ends of the shoes are bifurcated at 77, and the rear ends terminate in heels 78 which drag upon the ground. Knives 79 are situated at the base of each bifurcation. The purpose of the knives is to cut any brush or vines that may be in the path of the loader. The sides of the shoes 75 at the lateral sides of each unit, are bent up at 80 to form guards. The articulation of the shoes on the respective shafts 57, and the articulation of the elevator units on the common shaft 55, provides an extreme freedom of motion of these different parts which insures the positive gathering of all of the sheaves in the path of the loader, no matter how uneven the ground that the machine is traversing may be. When a depression is encountered, that one of the elevator units in line with the depression will fall therein, and the shoes at the front of this unit will scoop out the sheaf of grain should one have fallen into the depression.

A lifting bar 81 extends laterally beneath the oscillating elevator, for the purpose of raising the free end of the elevator from the ground when the loader is out of operation and is being conveyed from one place to another. The lifting bar may be actuated by any suitable handle or lever mechanism located within convenient reach of the operator when he occupies the front seat 82.

The operation of the device is as follows: The loader is intended to be propelled over a field over which the sheaves of grain are scattered, and to automatically pick up the sheaves and drop them into the container. When the container is full, the loader is backed up to the distributer and the load is gradually discharged upon the distributer and fed to the thresher. In doing this, the operator changes his seat. In gathering the sheaves, the seat 82 on the front is occupied. The operation of the loader is directed from this position. Suitable controlling mechanism for the engine and other portions of the loader is located near this seat.

No matter how uneven the surface of the field may be, the shoes 75 will conform to the hills and hollow as shown in Fig. 6, and consequently gather any and all sheaves that may lie in the path of the device.

While the construction and arrangement of the device is that of a generally preferred form, obviously modifications and changes may be made without departing from the spirit of the invention or the scope of the claims.

I claim:

1. A conveyer for sheaf loaders, comprising a relatively fixed elevator, and an oscillating elevator composed of a plurality of movable units arranged to adapt themselves to uneven ground surfaces.

2. A conveyer for sheaf loaders, comprising a relatively fixed elevator, an oscillating elevator composed of a plurality of movable units arranged to adapt themselves to uneven ground surfaces, and a shoe mounted on the front end of each of said units.

3. A conveyer for sheaf loaders, comprising an elevator, an oscillating elevator composed of a plurality of movable units arranged to adapt themselves to uneven ground surfaces, a shoe mounted on the front end of each of said units, and means embodied in each shoe for cutting vines in the path of the shoe.

4. A conveyer for sheaf loaders, comprising a container and an elevator, said elevator being relatively stationary with respect to the container, an oscillating elevator located ahead of said elevator, the oscillating elevator including a plurality of independently movable units, movable means carried by each unit adapted to engage the ground, and normally disengaged means disposed beneath the oscillating elevator and common to all of the units, for raising said units and said movable means out of contact with the ground.

5. A conveyer for sheaf loaders, comprising a container and an elevator for discharging the sheaves into the container, a common shaft situated in front of said elevator, an oscillating elevator supported on said shaft, said elevator including a plurality of belts, pulleys mounted on said common shaft receiving one end of each of said belts, a pulley at the other end of each of the belts, an independent shaft for each of said pulleys, and frames mounted on said common shaft and supporting each of said independent shafts.

6. In an elevator for sheaf loaders, a relatively fixed common shaft, a relatively movable shaft, frame members mounted on the common shaft and supporting the relatively movable shaft, said members swinging on the common shaft, a pulley on each of the shafts between the frame members, each pulley having an annular groove with sprocket teeth, a sprocket chain spanning the pulleys, and a belt running over the pulleys and secured to said chain.

7. In an elevator for sheaf loaders, side frame members including opposed bosses, a shaft supported in the bosses, and a pulley mounted on the shaft having end recesses to accommodate the bosses, and being provided with an annular groove having sprocket teeth, the extremities of the teeth being flush with the periphery of the pulley.

8. In an elevator for sheaf loaders, an oscillating elevator including independently movable units, side frame members for each unit, a shaft supported between the lower ends of each pair of said frame members and having a portion projecting beyond each frame member, hangers mounted on the projecting shaft portions, a shaft supported by the hangers, and a plurality of independently movable shoes mounted on said shaft.

9. In an elevator for sheaf loaders, the combination with side frame members, of a shaft mounted in the lower ends of a pair of said members and having a portion projecting beyond the sides of said members, hangers mounted on said projecting portions, a shaft carried by the hangers and a plurality of shoes including ears mounted on said shaft, said shoes including rearwardly extending heels and guards formed on the shoes at the lateral extremities of said shaft.

10. In a sheaf loader, a container, a relatively stationary elevator for discharging the sheaves into the container, said elevator including a platform, conveyer chains including upper strands moving over the platform, slats spanning the chains, and side boards supported on the platform and spaced inwardly from the chains to prevent entanglement of the straws with the chains.

RALPH BARCLAY MASON.